United States Patent
Han et al.

(10) Patent No.: US 7,146,711 B2
(45) Date of Patent: Dec. 12, 2006

(54) METHOD TO MAKE PLANARIZED GMR HEAD FOR HIGH TRACK DENSITY

(75) Inventors: Cherng Chyi Han, San Jose, CA (US); Mao-Min Chen, S.J., CA (US); Jiun-Ting Lee, Los Altos Hills, CA (US)

(73) Assignee: Headway Technologies, Inc., Milpitas, CA (US)

( * ) Notice: Subject to any disclaimer, the term of this patent is extended or adjusted under 35 U.S.C. 154(b) by 861 days.

(21) Appl. No.: 10/318,455

(22) Filed: Dec. 13, 2002

(65) Prior Publication Data

US 2004/0114281 A1    Jun. 17, 2004

(51) Int. Cl.
   *G11B 5/127*   (2006.01)
   *H04R 31/00*   (2006.01)
   *G11B 5/39*    (2006.01)

(52) U.S. Cl. .............. 29/603.13; 29/603.14; 29/603.15; 29/603.16; 29/603.18; 360/313; 360/319; 427/130; 216/22

(58) Field of Classification Search ........... 29/603.13, 29/603.14, 603.18, 603.12, 603.15, 603.16; 360/319, 313, 320, 322; 216/22, 40; 427/130, 427/131, 132

See application file for complete search history.

(56) References Cited

U.S. PATENT DOCUMENTS

| | | | | |
|---|---|---|---|---|
| 5,491,600 A | | 2/1996 | Chen et al. | 360/113 |
| 5,654,854 A | * | 8/1997 | Mallary | 360/327.3 |
| 5,707,538 A | * | 1/1998 | Shen et al. | 216/22 |
| 5,883,764 A | | 3/1999 | Pinarbasi | 360/113 |
| 6,228,276 B1 | * | 5/2001 | Ju et al. | 216/22 |
| 6,287,476 B1 | | 9/2001 | Ju et al. | 216/47 |
| 6,307,721 B1 | | 10/2001 | Chen et al. | 360/316 |
| 6,342,993 B1 | | 1/2002 | Sato | 360/319 |
| 6,493,926 B1 | * | 12/2002 | Han et al. | 29/603.14 |

* cited by examiner

*Primary Examiner*—Minh Trinh
*Assistant Examiner*—Tai Van Nguyen
(74) *Attorney, Agent, or Firm*—Saile Ackerman LLC; Stephen B. Ackerman

(57) ABSTRACT

A method for forming a planar GMR read-head having a narrow read gap, a narrow track-width and being well insulated from its lower shield. The method requires the formation of a planarized bottom magnetic shield in which concave regions, symmetrically disposed about a track-width region, are filled with a layer of dielectric to provide added insulation. The dielectric filled shield is planarized and an additional planar dielectric layer, a thin planar GMR sensor layer and a planar PMGI layer of uniform thickness is formed on it. A layer of photoresist is deposited on the PMGI layer and a bi-layer lift-off stencil of uniform height above the GMR layer and symmetric overhang regions is formed. The uniformity of the lift-off stencil, which is a result of the planarity of the layers on which it is formed, allows the deposition of conductive lead and biasing layers with controlled overspread.

11 Claims, 3 Drawing Sheets

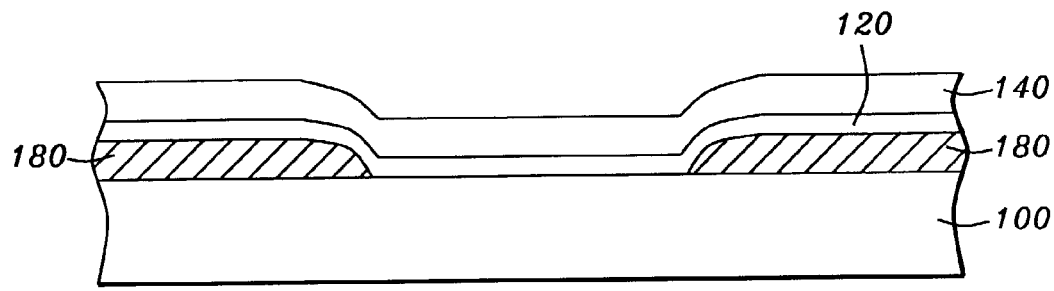
FIG. 1a – Prior Art
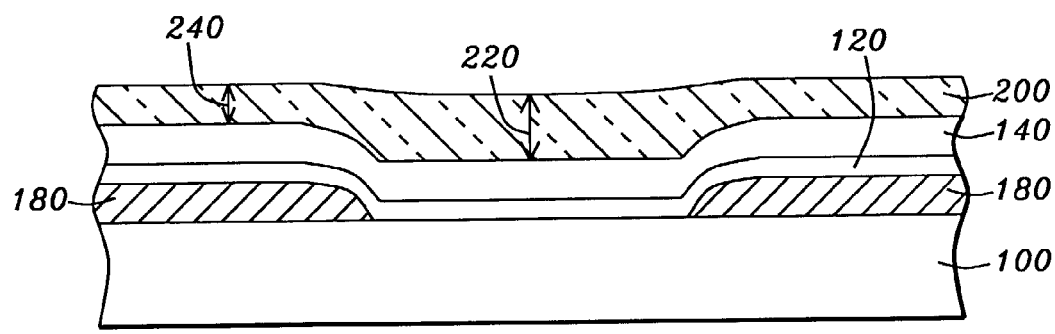
FIG. 1b – Prior Art
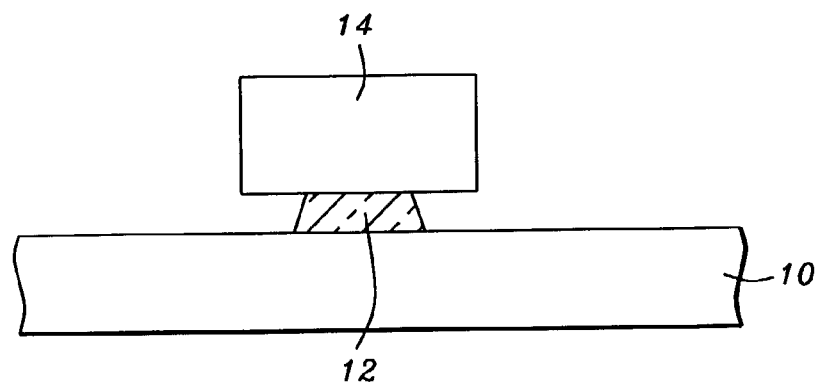
FIG. 2a

METHOD TO MAKE PLANARIZED GMR HEAD FOR HIGH TRACK DENSITY

BACKGROUND OF THE INVENTION

1. Field of the Invention

This invention relates generally to the fabrication of a giant magnetoresistive (GMR) magnetic read head, more specifically to a method of fabrication that allows better control of the sensor read-width while still maintaining a high level of insulation between the sensor and the lower shield.

2. Description of the Related Art

As GMR (giant magneto-resistive) magnetic read heads are required to read recorded media having increased linear densities and track densities, the active read-width portions of these heads must become correspondingly thinner (thin read-gap) and narrower (narrow read-width). This requirement necessitates the formation of GMR sensor layers that are thin, highly planar and have narrow and accurately defined read-widths. The formation of such a sensor layer places stringent constraints on the insulation between the layer and the magnetic shield on which it is typically formed. One way of achieving the dual requirement of a thin, planar GMR layer with adequate layer-to-shield insulation, is by the formation of an insulation layer having "patches," which are additional thicknesses of insulation in the regions to either side of the read-width region of the GMR layer. FIG. 1 (prior art) shows such a patch formation. Referring to FIG. 1a, there is shown a schematic cross-sectional view of a partially formed GMR read head, wherein a planarized lower shield (100) has sequentially formed upon it an insulating dielectric layer (120) and a GMR sensor layer (140). To either side of what will ultimately be the active portion of the sensor (the sensor read-width region), there are formed insulation patches (180), which provide an additional degree of insulating protection between the sensor layer (140) and the shield (100). The non-planar topology of this formation has negative consequences for the subsequent formation of conductive lead and biasing layers, which is the concern of the present invention.

Referring next to FIG. 1b, there is shown the consequences of depositing a polydimethylglutarimide (PMGI) layer (200) over the non-planar topology as a prior step in forming lead layers, biasing layers and upper shield layers. Such a PMGI layer is commonly formed as an initial step in the process of photolithographic stencil formation or other processes. In this case, the PMGI attains a non-planar profile with thickness variations shown by arrows (220, 240), which is disadvantageous for further processing.

Chen et al. (U.S. Pat. No. 6,307,721) disclose a thin read-gap, double layer sensor element having similar topology to the much simpler structure shown in FIG. 1 herein. The attempt to form a second GMR layer (FIG. 4 of Chen et al.) necessitates the formation of a lift-off stencil (38c and 38b of FIG. 4 of Chen) within a concavity. The use of such lift-off stencils is important for the formation (by deposition) of conducting lead layers and biasing layers an the lateral edges of a GMR sensor layer. Such stencils cannot accurately define the edges of the deposited layers and the "overspray" of the deposition beneath the stencil overhang can cause difficulties. Ju et al. (U.S. Pat. No. 6,287,476) teach a method of preventing current shunting through such overshoot regions by means of a passivation layer formed on the GMR layer surface.

Chen et al. (U.S. Pat. No. 5,491,600) also teach the use of a lift-off stencil formed of a lower pedestal of polydimethylglutarimide (PMGI) and an upper overhanging region of photoresistive material, to form lead and biasing layers against the lateral edges of a read sensor. The magnetoresistive sensor is not a GMR type sensor and its thinness, insulation from a lower shield and lateral definition are not as critical as in the devices addressed in the present invention.

Sato teaches a method of forming a thin film magnetic read head with a thicker lead layer by a process of forming a step in a lower shield layer, depositing an insulating layer over the stepped shield and then forming the sensor layer over the step portion. This method does not provide the planar surface topology of the present invention. Finally, Pinarbasi (U.S. Pat. No. 5,883,764), teaches the formation of a GMR sensor having multi-layered conducting leads. Like the teaching of Chen et al. (cited above), Pinarbasi teaches the use of a lift-off stencil to form the lead layers, but the requisite thinness of the sensor layer and its insulation from a lower shield is not a concern of the method.

SUMMARY OF THE INVENTION

A first object of this invention is to provide a method for forming a giant-magnetoresistive (GMR) sensor element having a planar sensor layer, a thin read-gap and a narrow read-width.

A second object of this invention is to provide a method for forming such a GMR sensor element that is well insulated from a lower shield on which it is formed.

A third object of this invention is to provide a method for forming such a sensor element that results in planar topologies and corresponding precision, efficiency and ease of fabrication steps.

A fourth object of this invention is to provide the GMR read-head so formed.

In accord with the objects of this invention there is provided a method of forming a GMR read-head wherein a first bi-layer lift-off stencil is used as an etching mask to form concave regions in a lower shield surrounding a central planar portion of said shield. The lift-off stencil is then used as a deposition stencil to allow the concave regions to be filled with an insulation dielectric. After removal of the stencil, the filled-in shield is planarized and a uniform blanket dielectric insulating layer is deposited. The planar dielectric layer provides an advantageous surface for the formation of a GMR layer, which is thin and planar. Finally, a PMGI layer of uniform thickness is formed on the GMR layer and the PMGI layer is patterned to form the pedestal of a second bi-layer lift-off stencil, which will be used to form conducting lead layers and magnetic biasing layers. Because of the thickness uniformity of the PMGI layer, problems with forming a non-uniform upper photoresist layer on the bi-layer stencil will be eliminated, leading to better control of the ion-beam deposition (IBD) of the lead layers and better definition of the track-width of the sensor layer.

BRIEF DESCRIPTION OF THE DRAWINGS

FIG. 1a (prior art) is a schematic cross-sectional view of a prior art GMR sensor showing how a thin sensor element with adequate insulation between it and a lower shield can be obtained by means of extra insulating layers.

FIG. 1b(prior art) shows the sensor element of FIG. 1a with a subsequently deposited PMGI layer that has disadvantageous variations in thickness.

FIGS. 2a–g is a series of schematic cross-sectional drawings of the method of the present invention applied to the formation of a planar read-element having a narrow read-width, a thin read-gap and adequate insulation between it and a lower shield.

FIG. 2a shows a first bi-layer lift-off process that will allow the formation of concave regions in a lower shield. In this figure the bi-layer etch mask/deposition stencil has been formed on the shield.

FIG. 2b shows the concave regions having now been formed in the shield by an ion-beam etch (IBE) and then filled by a deposition of a dielectric insulating layer.

FIG. 2c shows the first bi-layer having been lifted.

FIG. 2d shows the filled shield having been planarized and covered by a deposition of a planar dielectric insulating layer.

FIG. 2e shows the dielectric layer of FIG. 2d having been covered by a GMR sensor layer formation.

FIG. 2f shows the formation of 2e having now been covered by a layer of PMGI of uniform thickness.

FIG. 2g shows the PMGI layer of 2f having been patterned to form a pedestal on which is then formed an overlayer of photoresist. The uniform thickness of the PMGI allows a uniform and symmetric photoresist layer to be formed which, in turn, will allow a uniform deposition of conducting lead and biasing layers.

DESCRIPTION OF THE PREFERRED EMBODIMENT

The preferred embodiment of the present invention is a method for forming a GMR read head having a planar sensor element with a thin read-gap and narrow, precisely defined read-width which is well insulated from the bottom magnetic shield on which it is formed.

Referring first to FIG. 2a, there is shown an initial step in the method. The schematic drawing shows a cross-sectional view, in the air-bearing surface plane of the element, of a bottom magnetic shield (10) on which has been formed a bi-layer lift-off stencil of a type well known in the prior art. The stencil will serve, initially, as an ion-beam etching (IBE) mask and then serve, finally, as an ion-beam deposition (IBD) mask. The stencil is formed of a lower pedestal (12) of polydimethylglutamide (PMGI) formed to a thickness of between approximately 1000 and 4000 angstroms, on which is formed an upper portion (14) of photoresistive material. The upper portion overhangs the pedestal on each side and the overhang should be symmetric and within defined limits.

Figure 2B:
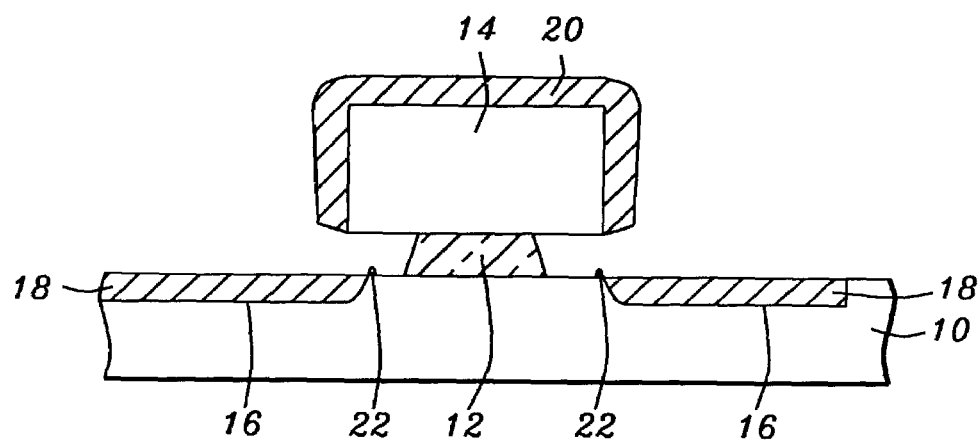

Referring next to FIG. 2b, there is shown a further schematic of the fabrication of FIG. 2a wherein an IBE has produced concave regions (16) of depth between approximately 500 and 1000 angstroms within the bottom shield (10), which regions have been subsequently filled with a dielectric insulating material such as alumina or silicon dioxide, to form a dielectric patch layer (18) therein. This patch layer will provide necessary additional insulation between the GMR layer to be formed and the bottom shield. Compare this recessed patch layer with the analogous non-recessed patch layer of prior art FIG. 1a (indicated as (180)), wherein the non-recessed nature of that layer results in a non-planar topology and disadvantageous thickness variations of the subsequently formed PMGI layer ((200) in FIG. 1b). The upper portion of the lift-off stencil (14) is shown covered with excess dielectric (20) and some overspread (22) of dielectric material is shown beneath the stencil.

Figure 2C:
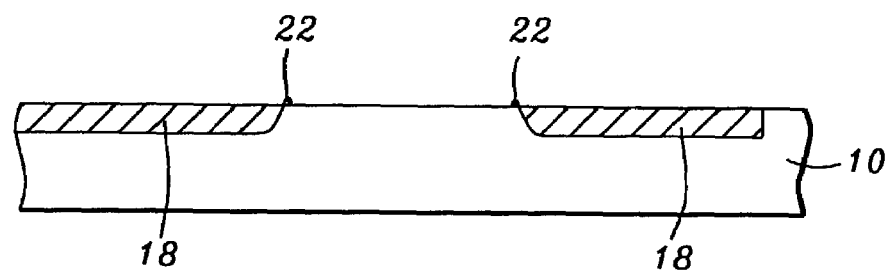

Referring next to FIG. 2c, there is shown schematically the surface of the bottom shield layer as in FIG. 2b, with the lift-off stencil now being removed.

Figure 2D:
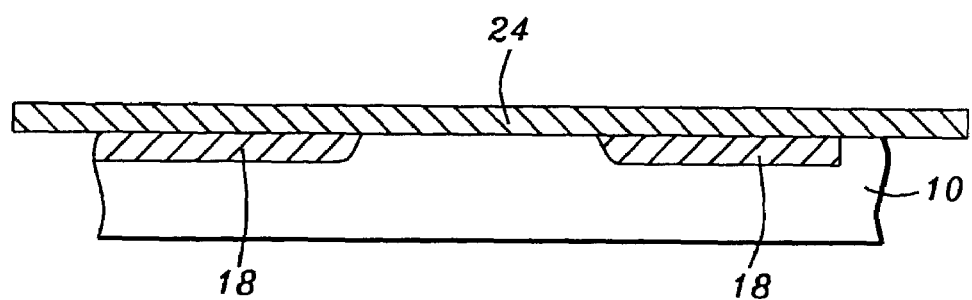

Referring next to FIG. 2d, there is shown, schematically, the formation of FIG. 2c wherein the bottom shield surface and exposed dielectric patch layer (18) has been planarized (its surface has been rendered smooth and planar) to remove the dielectric overspread and a thin, second planar dielectric insulating layer (24) has been formed over the entire surface. The dielectric layer can be formed of dielectric material such as alumina or silicon dioxide and is deposited to a thickness of between approximately 100 and 1000 angstroms.

Figure 2E:
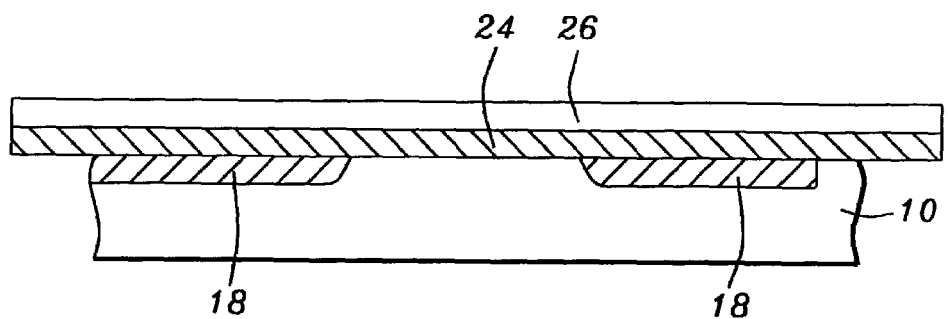

Referring next to FIG. 2e, there is shown, schematically, the formation of FIG. 2d wherein a GMR sensor layer (26) has been formed over the dielectric layer. The GMR sensor layer may be formed in any of a variety of configurations that are well known in the art and a spin valve configuration is used in the present embodiment. The novelty of the present invention is not in the particular structure of the layer, but in its thinness (providing a narrow gap-width), planarity and ultimate narrow track-width, when conducting lead layers are formed. In the preferred embodiment, the sensor layer is formed to a thickness of between approximately 300 and 500 angstroms.

Figure 2F:
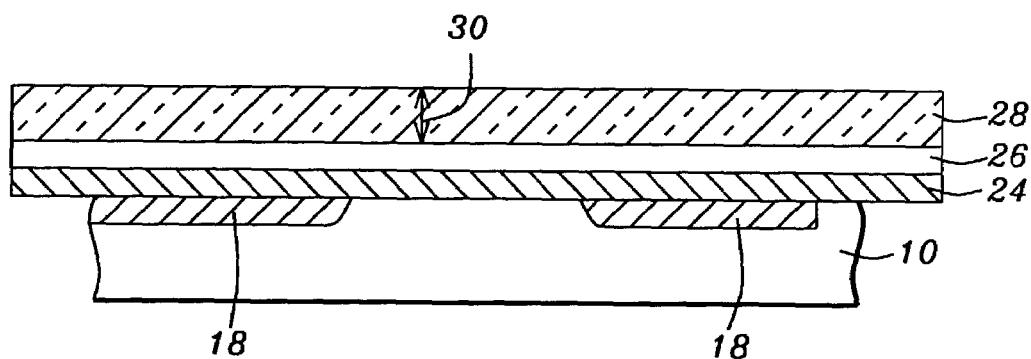

Referring next to FIG. 2f, there is shown, schematically, the formation of FIG. 2e wherein the GMR layer (26) has been covered by a layer of PMGI (28). The planarity of the GMR layer has allowed the PMGI layer to be formed with enhanced uniformity of thickness (the constant height being indicated by the arrow (30)).

Figure 2G:
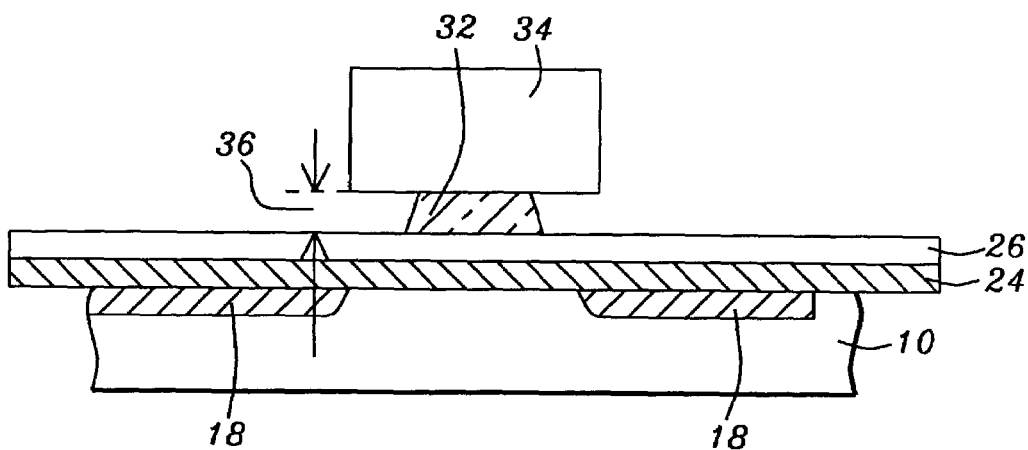

Referring finally to FIG. 2g, there is shown, schematically, the formation of FIG. 2f wherein the PMGI layer has been patterned to form a lift-off stencil, which comprises a pedestal (32) of PMGI on which rests a symmetrically overhanging layer of photosensitive material such as photoresist (34). This lift-off stencil will be of subsequent use in forming conducting lead layers and magnetic biasing layers (not shown). The method of forming the lift-off stencil is known in the art. It requires the photoresist to be formed over the PMGI layer, to be patterned with an organic solvent and, as a result of differential solubility of the photoresist and PMGI, to have the PMGI pedestal undercut to provide a symmetric overhang of the photoresist. It is the novelty of the present method that the uniform thickness of the PMGI layer ((28) in FIG. 2f) has permitted the pedestal (32) to have a uniform height and has also permitted the photoresist (34) to have a symmetrically formed overhang which is of uniform height above the GMR layer surface, as shown by the arrow (36). The symmetry and uniformity of the stencil will assure the subsequent formation of lead and biasing layers over the GMR layer (26) with minimal and well controlled overspread, allowing a narrow and well defined track-width region.

As is understood by a person skilled in the art, the preferred embodiment of the present invention is illustrative of the present invention rather than being limiting of the present invention. Revisions and modifications may be made to methods, processes, materials, structures, and dimensions through which is formed a planar GMR read-head of narrow read gap and track-width and well insulated from its lower shield, while still providing a planar GMR read-head of narrow read gap and track-width and well insulated from its lower shield, formed in accord with the present invention as defined by the appended claims.

What is claimed is:

1. A method for forming a planar GMR read-head having a narrow read gap and track-width and being well insulated from its lower shield comprising:
   providing a bottom magnetic shield as a substrate;
   forming over said shield a first bi-layer lift-off stencil;
   using said stencil as an etch mask to form concave regions in said shield symmetrically disposed to either side of said stencil;
   using said stencil as deposition mask, filling said concave regions with a first dielectric layer;
   removing said first bi-layer lift-off stencil;
   planarizing the surface of the shield and the surface of the dielectric filling the concave regions, forming thereby a single planar surface;
   forming over said single planar surface a second dielectric layer;
   forming over said second dielectric layer a GMR sensor layer;
   forming over said GMR sensor layer a layer of PMGI of uniform thickness;
   forming a layer of photoresistive material over said PMGI layer;
   patterning said photoresistive layer and said PMGI layer to form a second bi-layer lift-off stencil for use in the forming of conducting lead and biasing layers, the pedestal of said stencil being formed of the PMGI layer and the upper portion of said stencil being formed of the photoresistive material which symmetrically overhangs said pedestal and is of uniform height above the GMR layer.

2. The method of claim 1 further comprising the use of said second bi-layer lift-off stencil as a deposition mask to form conducting lead layers and magnetic biasing layers.

3. The method of claim 1 wherein said first bi-layer lift-off stencil comprises a pedestal formed of PMGI on which is formed an upper portion of photoresistive material.

4. The method of claim 1 wherein the concave regions in the bottom shield are formed to a depth of between approximately 500 and 1000 angstroms.

5. The method of claim 4 wherein the first dielectric layer is a layer of the dielectric material alumina or silicon dioxide.

6. The method of claim 1 wherein the second dielectric layer is a layer of the dielectric material alumina or silicon dioxide.

7. The method of claim 6 wherein the second dielectric layer is formed to a thickness of between approximately 100 and 1000 angstroms.

8. The method of claim 1 wherein said GMR sensor layer is a sensor configuration of the spin valve type.

9. The method of claim 8 wherein said spin valve is formed to a thickness of between approximately 300 and 500 angstroms.

10. The method of claim 1 wherein the layer of PMGI is formed to a uniform thickness of between approximately 1000 and 4000 angstroms.

11. The method of claim 1 wherein the symmetric overhang of the upper photoresist layer of the second bi-layer lift-off stencil is at a uniform height above the surface of the GMR layer.

* * * * *

UNITED STATES PATENT AND TRADEMARK OFFICE
CERTIFICATE OF CORRECTION

PATENT NO. : 7,146,711 B2  Page 1 of 1
APPLICATION NO. : 10/318455
DATED : December 12, 2006
INVENTOR(S) : Cherng Chyi Han, Mao-Min Chen and Juin-Ting Lee It is certified that error appears in the above-identified patent and that said Letters Patent is hereby corrected as shown below:

On Title Page
In the Inventors, (75), delete "Cherng Chyi Han, San Jose, CA (US); Mao-Min Chen, S.J., CA (US); Jiun-Ting Lee, Los Altos Hills, CA (US)" and replace with --Cherng Chyi Han, San Jose, CA (US); Mao-Min Chen, San Jose, CA (US); Jiun-Ting Lee, Los Altos Hills, CA (US)--.

Signed and Sealed this

Sixth Day of March, 2007

JON W. DUDAS
*Director of the United States Patent and Trademark Office*